United States Patent Office.

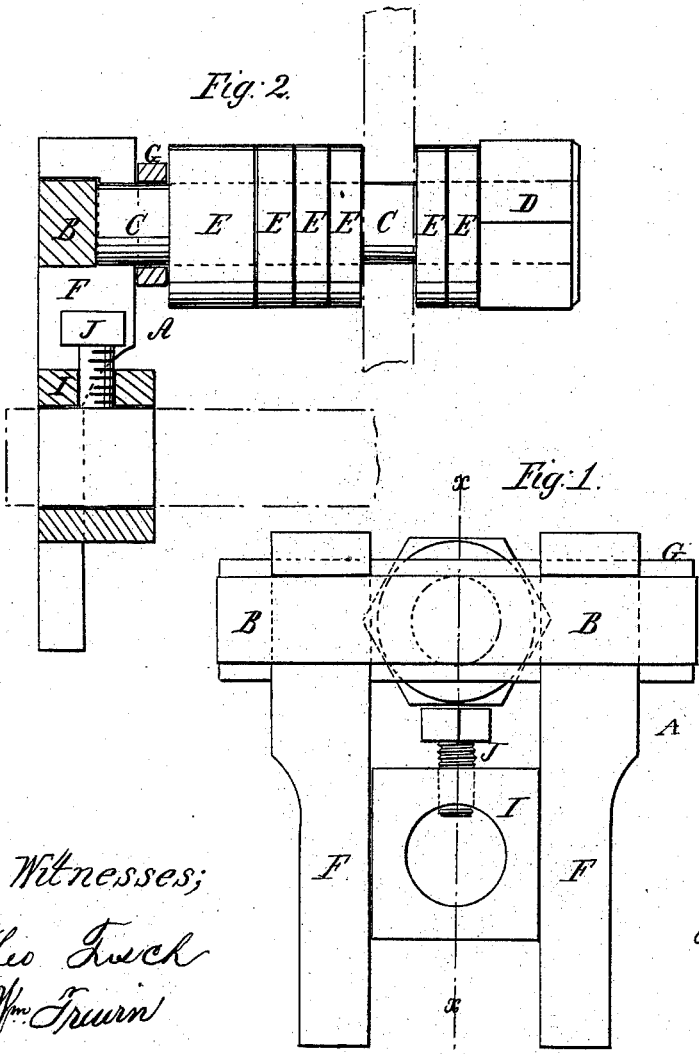

IMPROVEMENT IN LATHE CLUTCHES.

RICHARD ALLEN, OF JERSEY CITY, NEW JERSEY.

Letters Patent No. 60,113, dated December 4, 1866.

SPECIFICATION.

TO ALL WHOM IT MAY CONCERN:

Be it known that I, RICHARD ALLEN, of Jersey City, in the county of Hudson, and State of New Jersey, have invented a new and improved Carrier or Clutch for Lathes; and I do hereby declare that the following is a full, clear, and exact description thereof, which will enable others skilled in the art to make and use the same.

The present invention relates to a carrier or clutch for lathes, of that class of clutches which are employed for the turning of bolts more particularly; and the invention consists in so constructing the said clutch or carrier that bolts of various sizes, whether with or without heads, may be properly held and secured within the same, as will be obvious from the following detail description, reference being had to the accompanying plate of drawings, in which—

Figure 1 is a face view of the same; and

Figure 2, a transverse vertical section taken in the plane of the line $x$ $x$, fig. 1.

Similar letters of reference indicate like parts.

A, in the drawings, represents my new and improved clutch or carrier for lathes. This clutch, A, consists of a cross-bar, B, having a screw bolt, C, which, when the clutch is to be secured to the lathe, is passed through the face-plate of the same, and there fastened by a screw-nut, D, with washers or rings, E, between such nut and the said plate, and also the latter and cross-bar, B, according to the distance at which it is desired to have the clutch stand from the said head-plate, as plainly shown in fig. 2 of the drawings. To the cross-bar B, the upper ends of similar arms F are hung, one upon each side of the bolt C, so as to be moved in and out upon the said cross-bar, according to the distance at which it is desired to set or place them apart; these arms, F, being secured in whatever position they may be placed, by the screwing up of the nut D, hereinbefore referred to, which acts upon them, by and through the cross-arm or bar, G, loosely hung upon the screw-bolt, and interposed between the arms, E, and the outer washer or ring of the series of washers upon the outside of the face-plate. In and between the arms, F, of the carrier or clutch, one end of the bolt which is to be turned in the lathe, is secured; this bolt, if provided with no head, being fastened in the hollow nut by a set-screw, J, and this nut secured in and between the arms, E, as is plainly shown in fig. 2 of the drawings; but if the bolt is headed, the nut, I, is dispensed with; the arms, F, by being arranged or hung upon the cross-bar, B, as herein above explained, enabling them to be adjusted and set to correspond with the size of any bolt or its head, whether large or small, within the limits of the length of the bar B, as is obvious, without any further explanation.

I claim as new, and desire to secure by Letters Patent—

The carrier clutch constructed and operating substantially as described.

The above specification of my invention signed by me this 18th day of September, 1866.

RICHARD ALLEN.

Witnesses:
WM. F. MCNAMARA,
ALBERT W. BROWN.